Figure 1:
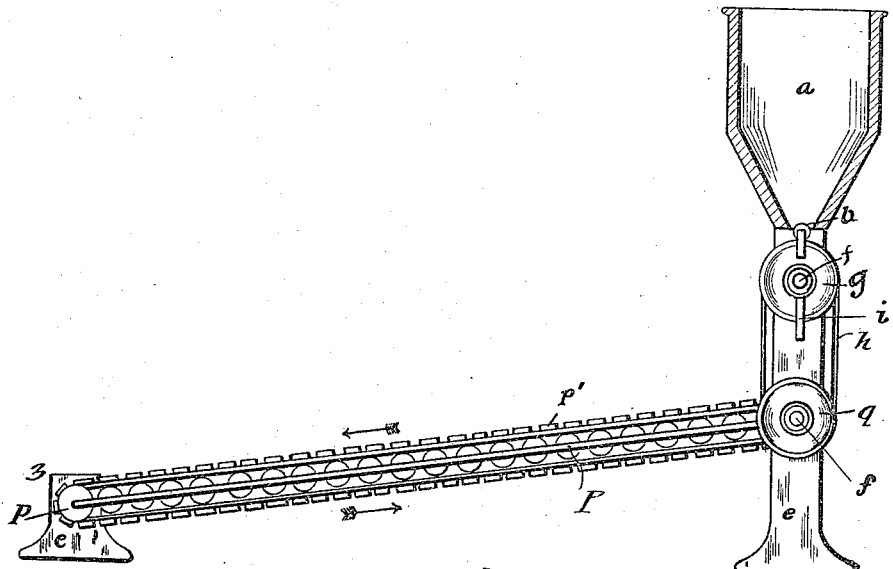

J. H. MORROW.
POULTRY FEEDER AND EXERCISER.
APPLICATION FILED AUG. 30, 1917.

1,268,869.

Patented June 11, 1918.

Inventor:
Joseph Harrison Morrow
per Chas. H. Riches
Attorney.

UNITED STATES PATENT OFFICE.

JOSEPH HARRISON MORROW, OF WELLAND, ONTARIO, CANADA.

POULTRY FEEDER AND EXERCISER.

1,268,869.

Specification of Letters Patent.　Patented June 11, 1918.

Application filed August 30, 1917.　Serial No. 189,005.

*To all whom it may concern:*

Be it known that I, JOSEPH HARRISON MORROW, of the town of Welland, in the county of Welland and Province of Ontario, Dominion of Canada, have invented certain new and useful Improvements in Poultry Feeders and Exercisers; and I hereby declare that the following is a full, clear, and exact description of the same.

This invention relates to a poultry feeder and exerciser comprising an appropriate feed receptacle having a shutter-controlled discharge orifice, an appropriate conveyer for the feed delivered through the discharge orifice, means actuated by the conveyer for moving the shutter, and a treadmill, with motion-transmitting mechanism, for operating the conveyer; the whole being so constructed and arranged that the poultry, when feeding, are obliged to work the treadmill, which, in turn, operates the conveyer, and through its action, opens the discharge orifice for the delivery of the feed to the conveyer which discharges it to a feed trough, or to the treadmill, the object of the invention being to compel the poultry to exercise themselvse for the feed consumed.

Figure 2:
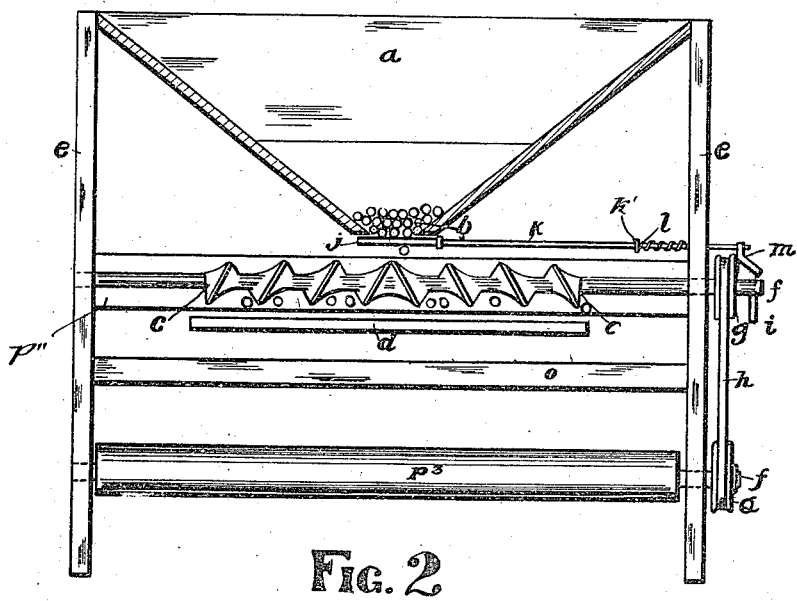

In the drawings:

Figure 1, is a side partial elevational section of a poultry feeder and exerciser, and, Fig. 2, is a front elevational section of the apparatus.

The structural details and the arrangement of the parts, of the poultry feeder and exerciser, may be varied within the scope of the appended claims, without departing from the principle of the invention, which is to devise an exercising apparatus which must be operated before the feed is obtainable, and which will automatically control the delivery of the feed to the poultry during its operation.

For the purpose of explaining the principle of the invention, I have shown in the accompanying drawings, a preferred type of apparatus, which consists of a feed receptacle $a$, preferably of the hopper type, having the usual discharge orifice $b$. Below the discharge orifice $b$ is a conveyer $c$ which, if for a single feeder and exerciser, would have either a right or a left screw $c'$, and for a double poultry feeder, would have a right and left screw, so that the feed, falling upon the conveyer, will be carried to the right and left of the discharge orifice $b$. Below the conveyer is a baffle $d$ extending evenly on both sides of the discharge orifice $b$, to prevent the feed descending from the discharge orifice directly to the trough.

As shown in Figs. 1 and 2, the feed receptacle $a$ is supported by an appropriate frame $e$, and, as shown in Fig. 2, the conveyer $c$ is provided with arbors $f$ suitably journaled in the frame. One of the arbors $f$ extends beyond the frame $e$ and is provided with a pulley $g$ for the belt $h$, and beyond the pulley $g$, the arbor is provided with an arm $i$. Controlling the discharge orifice $b$, is a shutter $j$, having a rod $k$ slidable in the frame $e$, and coiled on the rod $k$, between its pin $k'$ and the frame $e$, is a spring $l$, by which the shutter is moved to close the discharge orifice $b$ and shut off the flow of feed from the feed receptacle to the conveyer. The shutter outer end of the rod $k$ is provided with a bent arm $m$, which is engaged by the arm or cam $i$ during the rotation of the conveyer to move the shutter into an open position with respect to the discharge orifice $b$.

Below the baffle $d$, is a feed trough $o$, or other suitable depository to catch the feed falling from the baffle $d$, and below the feed trough $o$, is a treadmill $p$ consisting of a traveling apron $p'$ working around two rollers $p''$, $p^3$, journaled in the frame $e$. One of the arbors of the roller $p''$ is provided with a pulley $q$ on the same side of the frame $e$ as the pulley $g$, and passing around the pulleys $g$ and $q$ is the belt $h$, by which the motion of the roller $p''$ is transmitted to the conveyer $c$.

The poultry, in order to feed, must operate the traveling apron $p'$, which moves in the direction indicated by arrow in Fig. 1.

During the operation of the treadmill, the motion of the roller $p''$ is transmitted by the belt $h$ and pulleys $q$ and $g$, to the conveyer $c$, and at each revolution of the conveyer $c$, the arm $i$ engages the bent arm $m$ and moves the shutter to uncover the discharge orifice $b$, the orifice remaining uncovered while the arms $i$ and $m$ are engaged.

When the discharge orifice is open, the feed passes to the conveyer, which moves it, in the case of a single poultry feeder, to one end of the baffle $d$, from which it falls to the feed trough or other depository, from which the poultry may eat it.

In the case of a double poultry feeder, the screw works the feed to the opposite ends of the baffle, so that there will be an equal distribution for each bird feeding.

By means of this device, the poultry are compelled to take exercise before the feed is obtainable, and the result of such exercise is an improvement in their laying qualities, and a better class of chicks hatched from their eggs.

Having thus fully described the nature of my invention, what I claim as new and desire to secure by Letters Patent, is:—

A poultry feeder and exerciser comprising a feed receptacle having a discharge orifice, a spring-closed shutter controlling said orifice, a rod for said shutter, and an arm for said rod, in combination with a treadmill, a screw conveyer for distributing the feed delivered through said orifice, a baffle for said screw conveyer below the discharge orifice and extending to both sides thereof, a feed depository between the baffle and the treadmill to receive the distributed feed, an arm for the conveyer engaging with the shutter rod arm by which the shutter is moved at each revolution of the feed conveyer to open position, and motion transmitting means between the conveyer and the treadmill.

Welland, August 16th, 1917.

JOSEPH HARRISON MORROW.

Signed in the presence of—
 Estelle Phillips,
 Elizabeth Wood.

Copies of this patent may be obtained for five cents each, by addressing the "Commissioner of Patents, Washington, D. C."